United States Patent Office 3,329,517
Patented July 4, 1967

3,329,517
CEMENT ADDITIVES COMPOSED OF
ETHANOLAMINE SALTS
Vance H. Dodson, Jr., Needham, and Frank G. Serafin, Peabody, Mass., assignors to W. R. Grace & Co., Cambridge, Mass., a corporation of Connecticut
No Drawing. Filed Feb. 5, 1965, Ser. No. 430,739
12 Claims. (Cl. 106—90)

This application is a continuation-in-part of application Serial No. 339,875, filed January 24, 1964, and now abandoned.

This invention relates to hydraulic cements. In a particular aspect it relates to the use of an additive to improve the grinding and pack set characteristics of Portland cement.

Portland cement represents a class of hydraulic cements and is comprised essentially of two calcium silicates and a lesser amount of calcium aluminate. These cements are produced by heating an intimate mixture of finely divided calcareous material (limestone) and argillaceous material (clay) to fusion to form a clinker. The clinker is ground with the addition of about two percent of gypsum, or some other form of calcium sulfate, to obtain desired setting qualities in the finished cement. Small amounts of other substances are sometimes added during grinding to impart special properties to the product.

During grinding of the clinker, cleavage of the particles exposes fresh or nascent surfaces which have high energies due probably to the breaking of ionic bonds. The surface forces of the particles persist for some time after grinding and lead to pack set and/or poor cement fluidity if they are not reduced. Undue reduction or the complete absence of surface forces or attraction between the cement particles is undesirable because the cement becomes excessively fluid. On the other hand, if the surface forces are too great the cement tends to pack set and has a low bulk density because of the presence of high void volume agglomerates. Low bulk means that less cement by weight can be stored in a hopper or silo.

It has been known that certain polar molecules when added to the cement either during or after grinding will attach to the particles and reduce their surface forces. If the amount of additive used and/or if the time of addition are not correct, optimum dry dispersion is not obtained. For example, if an unusually active additive is present during grinding, it will produce a cement having extreme fluidity while in the mill. This causes the cement to pass rapidly through the mill before it is reduced to the desired size and, consequently, the number of recycle steps of oversized material is increased. Conversely, an additive which produces the desired degree of dry dispersion when ground with the clinker may not be realized if admixed after grinding.

The term "grinding aid" describes an increase in production at constant production rate during the grinding of cement clinker and gypsum in the finish mill. "Pack set inhibition" refers to a reduction in the amount of energy necessary to initiate flow in cement. Most cements when compacted by vibration become semi-rigid and will not flow until considerable mechanical effort has been applied to disintegrate the semi-rigid mass. The pack set inhibition property is particularly important in unloading the dry cement powder from storage silos after transportation of the cement in trucks, barges and railroad hopper cars.

It is, therefore, an object of this invention to provide an additive for Portland cement which serves a dual function as a grinding aid and pack set inhibitor. This objective is achieved by intergrinding with the cement an additive which is selected from the group consisting of an alkanolamine acetate and an acetylated alkanolamine acetate. Only a small amount of this additive need be used to achieve the desirable results, such as 0.005 to 0.050% based on the weight of the cement.

The additive reduces the surface forces of the cement to a desired state of dry dispersion that results in improved grinding and mill retention times as well as facilitating storage and transportation. It is assumed that a molecular layer of acetate ions is provided on the surface of the cement particles during the grinding process and this coating causes the fine cement particles to repel each other. This action prevents reagglomeration and increases the efficiency of the grinding operation. The repulsion of particles is believed to explain why the pack set index of cement interground with the additive is low.

The additive is derived from the residue obtained in preparing ethanolamines. The residue product may be derived from a number of well known methods which are employed to synthesize ethanolamines. It may be obtained from such reactions as the ammonolysis or amination of ethylene oxide, the reduction of nitro alcohols, the reduction of amino aldehydes, ketones and esters, and the reaction of halohydrins with ammonia or amines. The exact composition of the residue product varies within certain limits and, therefore, the term "ethanolamines" as used herein and in the claims refers to one or more mono-, di-, or triethanolamines. In general the residue product is predominantly triethanolamine, preferably, between 40 to 85% by volume triethanolamine. A specific residue product which is employed in a particularly preferred embodiment of this invention is a mixture of mono-, di-, and triethanolamine which is available commercially and has the following chemical and physical properties:

| | |
|---|---|
| Triethanolamine | 45 to 55% by volume. |
| Equivalent weight | 129 to 139. |
| Tertiary amine | 6.2 to 7.0 meq./gm. |
| Water | 0.5% by wgt., maximum. |
| Density | 9.49 lbs./gal. |

Because of the slight amount of water present in the above product, it is possible to determine its pH by use of a simple meter. The acetate salt is prepared by the addition of sufficient glacial acetic acid to cause the pH to drop to 7.0. Triethanolamine is used to represent the neutralization of the residue product in the following Equation 1, although it is to be understood that other species may be present, such as mono- and diethanolamines:

(1)
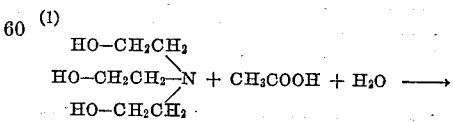

$$\longrightarrow \begin{array}{c} HO-CH_2CH_2 \\ HO-CH_2CH_2-NH^+-OOCCH_3 + H_2O \\ HO-CH_2CH_2 \end{array}$$

The acetylated ethanolamine acetate is produced by the addition of acetic anhydride to the residue product. The amount of anhydride which is added is sufficient to lower the pH of the mixture to 7.0. Formation of the acetylated salt is illustrated in Equations 2 and 3:

(2)
$$\begin{array}{c} HO-CH_2CH_2 \\ HO-CH_2CH_2-N + (CH_3CO)_2O + H_2O \longrightarrow \\ HO-CH_2CH_2 \end{array}$$

$$\begin{array}{c} HO-CH_2CH_2 \\ CH_3CCOO-CH_2CH_2-N + CH_3COOH + H_2O \\ HO-CH_2CH_2 \end{array}$$

(3)
$$\begin{array}{c} HO-CH_2CH_2 \\ CH_3COO-CH_2CH_2-N + CH_3COOH + H_2O \longrightarrow \\ HO-CH_2CH_2 \end{array}$$

$$\begin{array}{c} HO-CH_2CH_2 \\ CH_3COO-CH_2CH_2-NH^+-OOCCH_3 + H_2O \\ HO-CH_2CH_2 \end{array}$$

Both salts are soluble in water.

In one embodiment of this invention, the residue product having the following properties was used to prepare both the ethanolamine acetate and the acetylated ethanolamine acetate as illustrated in Examples 1 and 2.

Triethanolamine _____ 45 to 55% by volume.
Equivalent weight _____ 129 to 139.
Tertiary amine _____ 6.2 to 7.0 meq./gm.
Water _____ 0.5% by wgt., maximum.
Density _____ 9.49 lbs./gal.

EXAMPLE 1

The ethanolamine acetate was produced by neutralizing 100 g. of the above-identified residue product with 45 g. of glacial acetic acid. The reaction was exothermic and heat of neutralization was produced.

EXAMPLE 2

The acetylated ethanolamine acetate was prepared by neutralizing 224 g. of the above-identified residue product with 141.5 g. of acetic anhydride. Heat of neutralization plus esterification was produced.

The properties of both salts are indicated below:

| Property | Ethanolamine Acetate (Ex. 1) | Acetylated Ethanolamine Acetate (Ex. 2) |
|---|---|---|
| Color | Dark brown | Dark brown. |
| Viscosity, cps. at 70° F. | 25 | ~25. |
| Water solubility | Completely soluble at all concentration levels. | Completely soluble at all concentration levels. |
| Specific gravity, at 70° F. | 9.59 lbs./gal | 9.30 lbs./gal. |

In another embodiment, the residue product having the following properties was used to prepare the novel additives of this invention as illustrated in Example 3.

Triethanolamine _____ 80% by volume.
Equivalent weight _____ 150.
Tertiary amine _____ 6.56 meq./gm.
Water _____ 0.3% by weight, maximum.
Specific gravity, 20/20° C. __ 1.1280.

EXAMPLE 3

The ethanolamine acetate was produced by neutralizing 100 g. of the above-identified residue product with 45 g. of glacial acetic acid. The reaction was exothermic and heat of neutralization was produced.

The salts prepared above were viscous liquids and capable of dilution with water to produce a solution of any desired concentration. In a 60% aqueous solution, the pH dropped to 5.5 after a few days storage but no lower than that. If the residue used contains mono- and diethanolamines, it is considered highly possible that a mixture of acetate salts is produced.

The invention is further illustrated by the data which appear in the following Tables 1 to 8. The expression "percent by weight solids additive" refers to the active ingredients of the salt irrespective of whether in aqueous solution or not. A barrel of cement is equal to 376 lbs.

The information in the tables was obtained by testing individual batches of the same type of Portland cement, each of which was prepared in the following manner:

The clinker was charged to a laboratory steel ball grinding mill and the mill was closed and heated to a temperature between 210° F. and 230° F. prior to rotation. The additive was then passed in aqueous solution to the mill and after a fixed number of revolutions the mill was stopped and the pack set index and other properties of the ground cement were determined.

Pack set index is a relative term which indicates the proclivity of a particular cement to pack set when it is stored or transported in bulk. The index is obtained in the following manner:

One hundred grams of cement are placed in a 250 milliliter Erlenmeyer flask set on top of a variable vibrator. The flask containing the cement is vibrated for 15 seconds after which time it is removed from the vibrator and fed into a jig with the axis of the flask lying horizontally. The flask is then rotated about its axis until the cement, which is compacted on the bottom of the flask, collapses. The flask is twisted by turning at 180° angles at approximately 100 twists per minute. The number of 180° twists required for the cement sample to collapse established the pack set index. Thus, the greater the energy requirement to break up the bed, the higher will be the pack set index.

As used in the tables, Type I Portland cement refers to general purpose cement, Type II means a cement which has low heat of hydration and moderate sulfate resistance, and Type III refers to a high early strength cement. These types are described in ASTM C150–12.

TABLE 1

This table shows the results of intergrinding the ethanolamine acetate of Example 1 with a Type I Portland cement clinker containing 2.5% gypsum. The additive was incorporated at a rate of 0.01% solids per solids cement. An untreated cement is also included for purposes of comparison.

| Additive | Grinding Time (minutes) | Blaine Surface Area (cm.²/g.) | Pack Set Index |
|---|---|---|---|
| Blank | 110 | 3,220 | 9 |
| Ethanolamine acetate (Ex. 1) | 100 | 3,260 | 4 |

It is noted that the cement which was interground with the ethanolamine acetate had a pack set index of 125% lower than the untreated cement. The lower index shows that the additive lessens the tendency of the cement to compact. The increase in surface area of the treated cement using a shorter grinding time indicates that improved grinding efficiency is achieved with the use of the additive of this invention.

TABLE 2

This table reflects the comparative compressive strengths of the cements of Table 1. The strengths were determined as ASTM C-109 2-inch mortar cubes.

| Additive | Compressive Strength, p.s.i. | | |
|---|---|---|---|
| | 1-day | 7-day | 28-day |
| Blank | 1,308 | 3,588 | 5,100 |
| Ethanolamine Acetate (Ex. 1) | 1,328 | 3,525 | 5,438 |

The improvement in the 28-day strength of the treated cement is quite marked. This is significant because it serves to indicate the ultimate structural strength.

Results similar to those reported in Tables 1 and 2 were found when the same procedure was applied to Type III Portland cement. The additive was interground with the cement at a rate of 0.0167% solids additive per solids cement and the results are shown in Table 3.

It is noted that the ethanolamine acetate improves the grindability and compressive strengths of Type III Portland cement.

Further tests were carried out on Type III Portland cement in which the effects of the addition of ethanolamine acetate and acetylated ethanolamine acetate were compared with untreated cement. The comparisons appear in Table 4. The additives were employed at a rate of 0.0167% additive solids per cement solids. The procedure of Table 1 was followed in this test.

TABLE 3

| Additive | Grinding Time (minutes) | Blaine Surface Area (cm.²/g.) | Compressive Strength, p.s.i. | | |
|---|---|---|---|---|---|
| | | | 1-day | 7-day | 28-day |
| Blank | 140 | 4,640 | 2,010 | 5,525 | 6,712 |
| Ethanolamine Acetate (Ex. 1) | 140 | 4,750 | 2,300 | 6,138 | 6,875 |

TABLE 4

| Additive | Grinding Time (minutes) | Blaine Surface Area (cm.²/g.) | Compressive Strength, p.s.i. | | |
|---|---|---|---|---|---|
| | | | 1-day | 7-day | 28-day |
| Blank | 180 | 4,700 | 1,602 | 5,075 | 6,575 |
| Ethanolamine Acetate (Ex. 1) | 165 | 4,900 | 1,812 | 5,100 | 6,862 |
| Acetylated Ehtanolamine Acetate (Ex. 2) | 165 | 5,105 | 1,802 | 5,288 | 7,088 |

Both additives improved the grinding efficiency as reflected by the higher surface areas using a shorter grinding time and the compressive strengths as compared with the untreated cement.

Tables 5 to 7 present data relating to the use of the additives in field tests. The tests were carried out in commercial grinding mills which were swept with air at a high velocity. The results of the tests are tabulated as follows:

TABLE 5

| | Blank | Acetylated Ethanolamine Acetate (Ex. 2) | Ethanolamine Acetate (Ex. 1) |
|---|---|---|---|
| Type I—Portland Cement: | | | |
| Addition Rate [1] | | 0.09 | 0.03 |
| Production Rate [2] | 85 | 128 | 107 |
| Pack Set Index | 100+ | 8 | 13 |
| Type II—Portland Cement: | | | |
| Addition Rate [1] | | 0.06 | 0.04 |
| Production Rate [2] | 79.5 | 85.8 | 84.3 |
| Pack Set Index | 100+ | 5 | 12 |
| Type III—Portland Cement: | | | |
| Addition Rate [1] | | 0.12 | 0.09 |
| Production Rate [2] | 81.7 | 88.6 | 87.8 |
| Pack Set Index | 100+ | 9 | 10 |

[1] The number of pounds of additive added for each barrel of cement produced.
[2] Barrels per hour where one barrel consists of 376 pounds of cement.

It is noted that the production rate was increased and the pack set index was greatly reduced by the use of the additives in treating the three types of cement.

TABLE 6
[ASTM C-109 Mortar Compressive Strength Test]

| Type of Portland Cement | Additive | Addition Rate [1] | Compressive Strength, p.s.i. | | |
|---|---|---|---|---|---|
| | | | 1-day | 7-day | 28-day |
| I | Blank | | 1,069 | 4,579 | 6,880 |
| I | Acetylated Ethanolamine Acetate (Ex. 2) | 0.09 | 1,250 | 4,921 | 6,875 |
| I | Ethanolamine Acetate (Ex. 1) | 0.03 | 1,310 | (²) | (²) |
| II | Blank | | 718 | 3,708 | 6,392 |
| II | Acetylated Ethanolamine Acetate (Ex. 2) | 0.06 | 802 | 3,680 | 6,425 |
| II | Ethanolamine Acetate (Ex. 1) | 0.04 | 754 | 3,757 | (²) |
| III | Blank | | 2,712 | 5,358 | 6,892 |
| III | Acetylated Ethanolamine Acetate (Ex. 2) | 0.12 | 3,166 | 5,929 | 7,171 |
| III | Ethanolamine Acetate (Ex. 1) | 0.09 | 3,500 | 6,067 | (²) |

[1] The number of pounds of additive added per barrel of cement.
[2] Tests not run.

The improvement in compressive strength is quite marked for the Type III cement and apparent at one day for the Type II cement. The early compressive strength of Type I treated cement was better than the untreated product.

TABLE 7
[ASTM C-185 Mortar Air Entrainment Test]

| Type of Portland Cement | Additive | Addition Rate[1] | Percent Air Entrained |
|---|---|---|---|
| I | Blank | | 8.0 |
| I | Acetylated Ethanolamine Acetate (Ex. 2) | 0.09 | 7.4 |
| I | Ethanolamine Acetate (Ex. 1) | 0.03 | 7.6 |
| II | Blank | | 8.2 |
| II | Acetylated Ethanolamine Acetate (Ex. 2) | 0.06 | 8.2 |
| II | Ethanolamine Acetate (Ex. 1) | 0.04 | 8.2 |
| III | Blank | | 7.9 |
| III | Acetylated Ethanolamine Acetate (Ex. 2) | 0.12 | 8.0 |
| III | Ethanolamine Acetate (Ex. 1) | 0.09 | 7.5 |

[1] The number of pounds of additive added per barrel of cement.

Table 7 indicates that the additives do not entrain air in cement. This is a fault with several commercially-available additives.

The grinding efficiency of the additives of this invention were compared with a commercial grinding aid containing 25% calcium acetate. Table 8 shows the comparison in grinding a Type III Portland cement clinker.

TABLE 8

| Additive | Moles of Acetate Ion Added | Blaine Surface Area (cm.²/g.) |
|---|---|---|
| Blank | | 4,700 |
| Commercial Additive containing 25% calcium acetate | 0.00555 | 4,800 |
| Ethanolamine Acetate (Ex. 1) | 0.00306 | 4,900 |
| Acetylated Ethanolamine Acetate (Ex. 2) | 0.00383 | 5,105 |

It is noted that the additives of this invention gave improved grinding efficiencies over the commercial additive. This fact tends to show that the improvement is not due solely to the presence of the acetate ion alone but to the composition in its entirety.

The additives of this invention are soluble in water without sludging. They act as effective grinding aids and pack set inhibitors and increase the compressive strengths of mortars made from cements. In addition, they produce no incremental air (entrainment) in mortars or concretes.

What is claimed is:
1. A Portland cement additive comprising the residue product of ethanolamine synthesis neutralized with a member selected from the group consisting of acetic acid and acetic anhydride, said residue product being a mixture of mono-, di-, and triethanolamines having the following properties before neutralization:

Triethanolamine _____ 45 to 55% by volume.
Equivalent weight _____ 129 to 139.
Tertiary amine _____ 6.2 to 7.0 meq./gm.
Water _____ 0.5% by weight, maximum.
Density _____ 9.49 lbs./gal.

2. An additive according to claim 1 wherein the neutralizing member is acetic acid.
3. An additive according to claim 1 wherein the neutralizing member is acetic anhydride.
4. A composition comprising Portland cement and intimately admixed therewith between about 0.005 and 0.050 weight percent of an additive comprising the residue product of ethanolamine synthesis neutralized with a member selected from the group consisting of acetic acid and acetic anhydride, said residue product being predominantly triethanolamine.
5. A composition comprising Portland cement and intimately admixed therewith between about 0.005 and 0.050 weight percent of an additive comprising the residue product of ethanolamine synthesis neutralized with a member selected from the group consisting of acetic acid and acetic anhydride, said residue product being a mixture of mono-, di-, and triethanolamines having the following properties before neutralization:

Triethanolamine _____ 45 to 55% by volume.
Equivalent weight _____ 129 to 139.
Tertiary amine _____ 6.2 to 7.0 meq./gm.
Water _____ 0.5% by weight, maximum.
Density _____ 9.49 lbs./gal.

6. A composition according to claim 5 wherein the neutralizing member is acetic acid.
7. A composition according to claim 5 wherein the neutralizing member is acetic anhydride.
8. A process for reducing the tendency of Portland cement to pack set during storage and transportion which comprises introducing during the grinding of the cement between about 0.005 and 0.050 weight percent of an additive comprising the residue product of ethanolamine synthesis neutralized with a member selected from the group consisting of acetic acid and acetic anhydride, said residue being predominantly triethanolamine.
9. A process for reducing the tendency of Portland cement to pack set during storage and transportation which comprises introducing during the grinding of the cement between about 0.005 and 0.050 weight percent of an additive comprising the residue product of ethanolamine synthesis neutralized with a member selected from the group consisting of acetic acid and acetic anhydride, said residue product being a mixture of mono-, di-, and triethanolamines having the following properties before neutralization:

Triethanolamine _____ 45 to 55% by volume.
Equivalent weight _____ 129 to 139.
Tertiary amine _____ 6.2 to 7.0 meq./gm.
Water _____ 0.5% by weight, maximum.
Density _____ 9.49 lbs./gal.

10. A process according to claim 9 wherein the neutralizing member is acetic acid.
11. A process according to claim 9 wherein the neutralizing member is acetic anhydride.
12. A Portland cement additive comprising the residue product of ethanolamine synthesis neutralized with a member selected from the group of acetic acid and acetic anhydride, said residue product being a mixture of mono-, di-, and triethanolamines having the following properties before neutralization:

Triethanolamine _____ 80% by volume.
Equivalent weight _____ 150.
Tertiary amine _____ 6.56 meq./gm.
Water _____ 0.3% by weight, maximum.
Specific gravity, 20/20° C.__ 1.1280.

References Cited
UNITED STATES PATENTS

| 1,897,816 | 2/1933 | Othmer | 260—490 |
| 2,333,770 | 11/1943 | Dickey et al. | 260—490 |
| 2,857,286 | 10/1958 | Striker | 106—102 |
| 3,068,110 | 12/1962 | Fagerholt | 106—102 |
| 3,093,499 | 6/1963 | Blackwood et al. | 106—90 |
| 3,094,425 | 6/1963 | Adams et al. | 106—315 |

FOREIGN PATENTS
470,365  8/1937  Great Britain.

TOBIAS E. LEVOW, Primary Examiner.
HELEN M. McCARTHY, Examiner.
S. E. MOTT, Assistant Examiner.